Sept. 30, 1969   D. C. PORTER   3,469,594
HYDRAULIC-OPERATED FLUID MIXING PUMP
Filed Feb. 1, 1966   4 Sheets-Sheet 1

INVENTOR.
DONALD C. PORTER
BY
ATTORNEY

INVENTOR.
DONALD C. PORTER
BY
ATTORNEY

Sept. 30, 1969     D. C. PORTER     3,469,594
HYDRAULIC-OPERATED FLUID MIXING PUMP
Filed Feb. 1, 1966     4 Sheets-Sheet 3
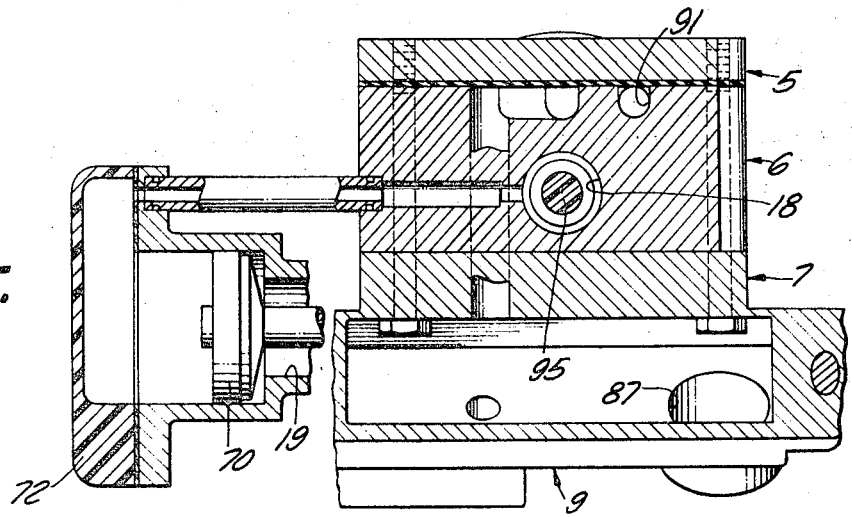
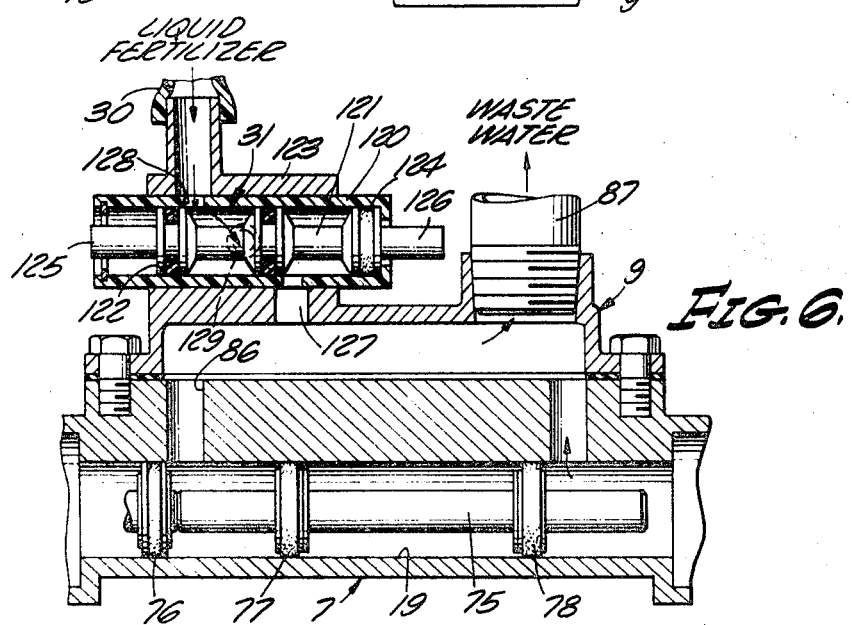
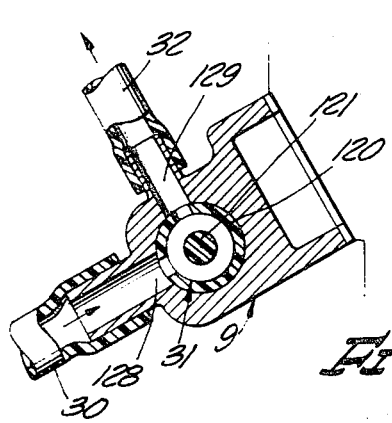
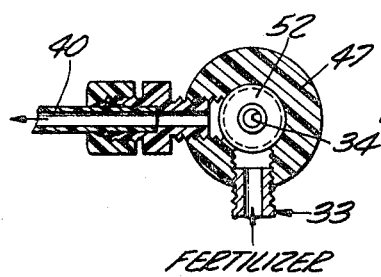
INVENTOR.
DONALD C. PORTER
BY
ATTORNEY

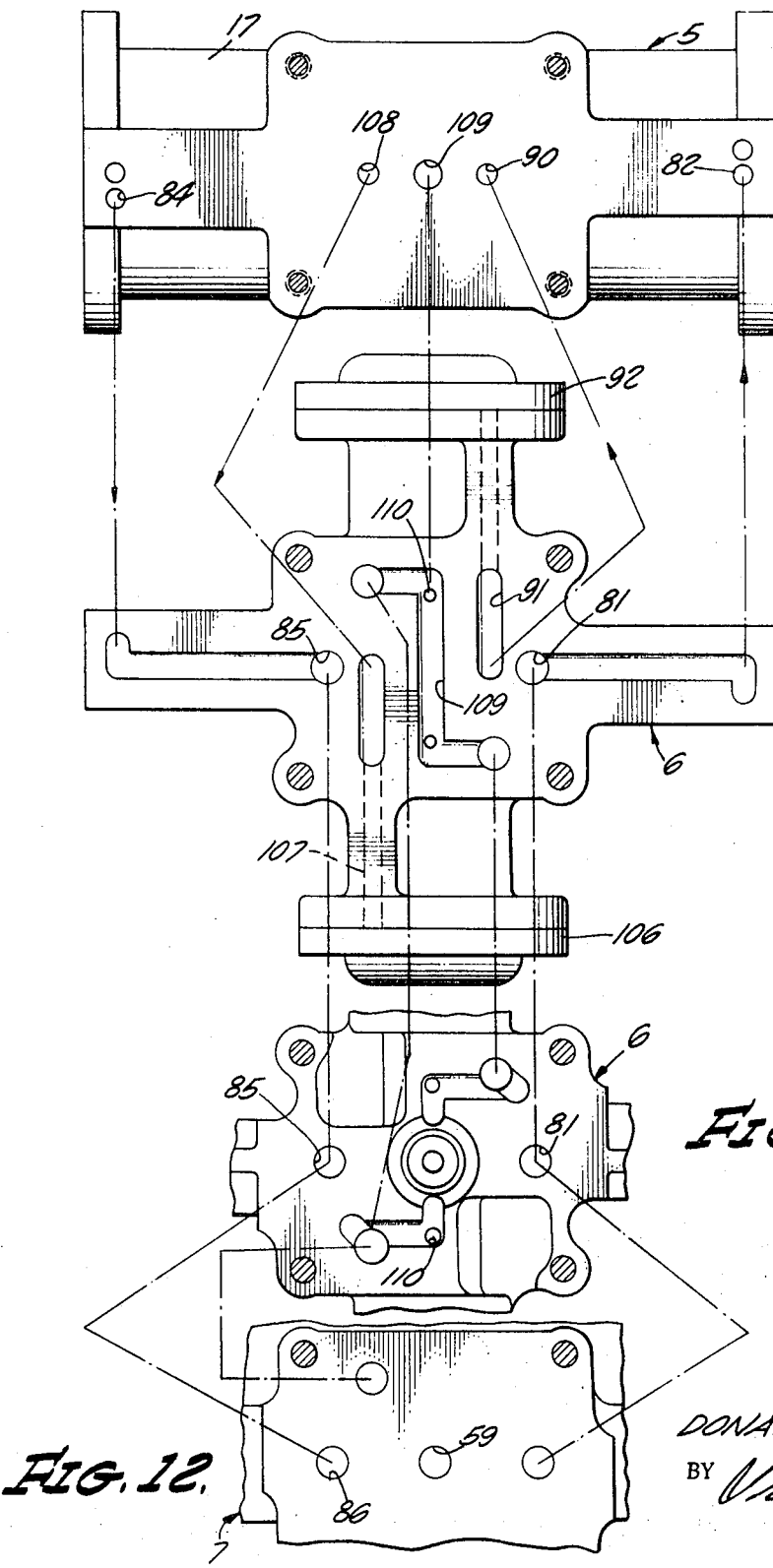

_United States Patent Office_

3,469,594
Patented Sept. 30, 1969

3,469,594
HYDRAULIC-OPERATED FLUID MIXING PUMP
Donald C. Porter, Los Angeles, Calif., assignor to D. M. McCaffrey and Patricia Ann McCaffrey, both of Clermont, Fla.
Filed Feb. 1, 1966, Ser. No. 524,308
Int. Cl. G05d 11/035; F04b 21/00; F16j 15/34
U.S. Cl. 137—99     5 Claims

ABSTRACT OF THE DISCLOSURE

A pump for injecting a fluid such as fertilizer into water flowing through a pipe. A reciprocating pump motor powered by water pressure in the pipe drives a slave pump which injects a metered amount of fluid into the water downstream of the pump motor. A seal between chambers containing water and the injection fluid has a pair of sealing members spaced by an intermediate area vented to the atmosphere.

---

This invention relates to a system for injecting liquid fertilizer into a liquid, such as water, the power therefor being provided by the water pressure.

My Patent No. 2,920,640, of January 12, 1960, and Patent No. 3,330,290, issued July 11, 1967, disclose and claim pumps of this general type, the hydraulic principle of actuation also being of the same general type.

It has been found in the operation of this type of pump that where the valves and seals thereof are suitable for water of a certain chemical composition and for certain fertilizers, the pump is very satisfactory. However, in certain other areas where the chemical composition of the water is different, a chemical interaction between the water and fertilizer occurs if they come in contact or occupy the same channels at different times, which can shorten the operative life period of the pump.

The patent and application mentioned above are directed to pumps of utilizing the water pressure for actuating the pump which injects a liquid fertilizer into the water. In Patent No. 3,330,290 mentioned above, I have provided a construction for flushing the conduits or passages of the fertilizer portion of the pump after use, thus reducing corrosion produced by contact between the water and fertilizer. However, corrosive vapors may still be present to damage the valves of the pump.

Prior pumps direct both the water and the fertilizer through the pilot and control valves which can produce corrosive vapors. The present invention not only incorporates the flushing feature of the prior pump but also incorporates both a mechanical and a chemical filter for the water. However, the salient feature of the pump of this invention resides in the separation between the water conduits or passages and the fertilizer conduits or passages while directing any vapors which may be generated in the pump to the atmosphere. Thus, the pump may be used in all territories regardless of the composition of the water or the composition of the fertilizer.

The principal object of the invention, therefore, is to facilitate the injection of a liquid of one composition into a liquid of a second composition.

Another object of the invention is to provide an improved hydraulically operated pump for injecting a liquid fertilizer into a water line without the retaining of any corrosive vapors in the pump.

A further object of the invention is to provide an easily operated flush-out system for a liquid fertilizer path while eliminating any destructive vapors from the pump.

A still further object of the invention is to provide a pump actuated by water pressure for introducing a liquid fertilizer into irrigation water which is suitable for water and fertilizers of different compositions.

A better understanding of this invention may be had from the following detailed description when read in conjunction with the accompanying drawings, in which:

FIG. 5 is a cross-sectional view taken along the line 5—5 of FIG. 2;

FIG. 6 is a cross-sectional view taken along the line 6—6 of FIG. 2;

FIG. 7 is a detail cross-sectional view of the fertilizer valve;

FIG. 8 is a detail cross-sectional view taken along the line 8—8 of FIG. 4;

FIG. 9 is a bottom view of the ports in the top casting and taken along the line 9—9 of FIG. 4;

FIG. 10 is a top view showing the ports in the central casting of the pump and taken along the line 10—10 of FIG. 4;

FIG. 11 is a bottom view showing the ports in the central casting of the pump and taken along the line 11—11 of FIG. 4; and FIG. 12 is a top view showing the ports in the lower casting of the pump and taken along the line 12—12 of FIG. 4.

Figure 1:
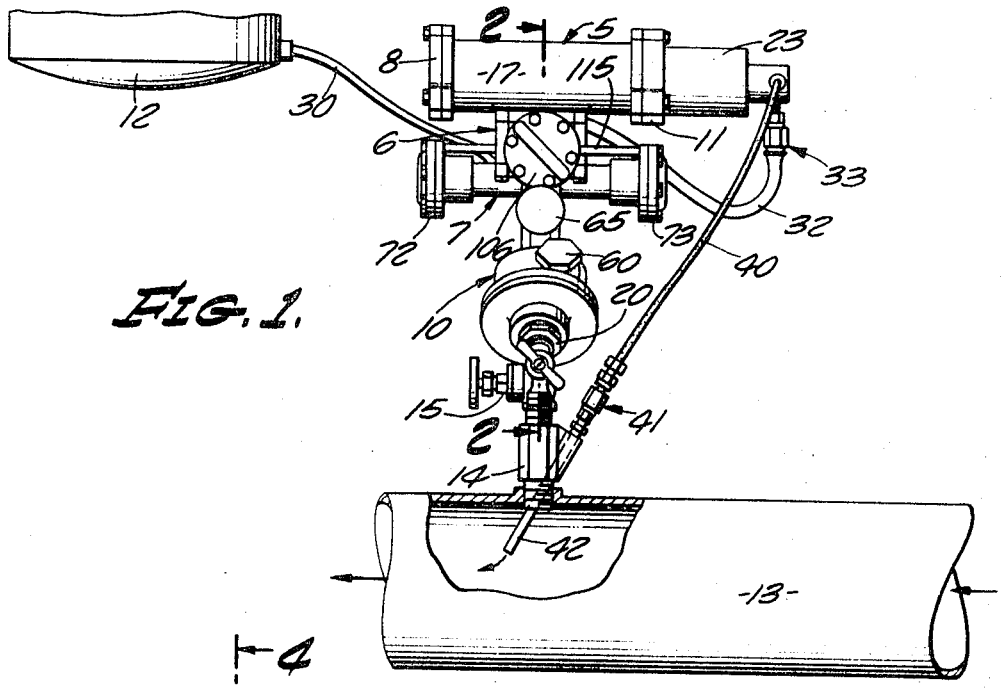
FIG. 1 is a front elevational view of a pump embodying the invention.

Referring, now, to the drawings in which the same reference numerals indicate the same elements, and particularly to FIGS. 4, 9, 10, 11 and 12, a top casting 5 containing power piston 83 has a cylindrical configuration with a closing end plate 8 and a coupling 11 at the other end thereof for attachment to end bell 23. Under the casting 5 is a central pilot valve casting 6 which is connectable to casting 5 in any suitable manner, such as by bolts. Below the central casting is a lower casting 7 in which is the water inlet. Small castings are used for the discharge manifold 9 and for the water filter 10 as shown in FIG. 2.

FIG. 1 shows a fertilizer reservoir 12 which is connected by a pipe or tube 30 to the flush-out valve 31 shown in FIGS. 6 and 7 the fertilizer entering by tube 30 and feeding tube 32 connected to the check valve 33. The main water pipe 13 contains water under pressure and flowing in the direction shown by the arrows. The coupling 14 connects the pump to the water pipe 13. A shut-off valve 15 is shown in the coupling so that the pump may be removed from the water line after valve 15 is closed.

Referring, now, to the power section of the pump, inside the power cylinder 17 of the casting 5 is a power piston 83 having end seals 116 and 117 and a hollow injection cylinder 27. A rod 35 passing through the outer power piston 83 has one end welded to cylinder 27 and the end fastened by a nut 149. The seals 116 and 117 may be of any suitable type, such as a plastic or rubber composition. The pilot valve cylinder 18 is shown in casting 6 and has an axis at right angles to the axis of the piston 83 and injection cylinder 27. The control valve cylinder 19 has its axis parallel with the axis of the power piston 83 and injection cylinder 27.

Figures 2, 3:
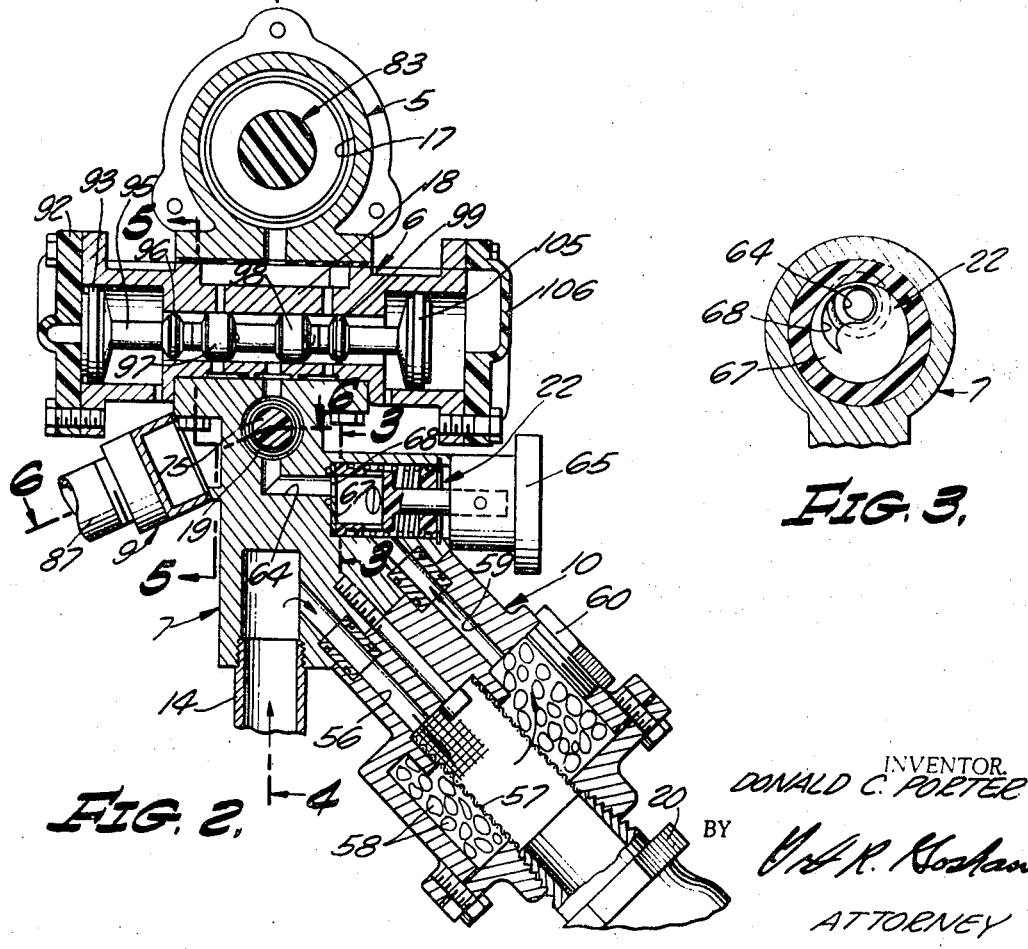
FIG. 2 is a cross-sectional view taken along the line 2—2 of FIG. 1.
FIG. 3 is a detail view of the metering valve taken along the line 3—3 of FIG. 2.

In FIG. 2, a drain valve plug 20 is used for purposes of removing a screen filter 57, while a plug 60 provides access to chemical material 58. The metering valve 22 has a control knob 65 connected by means of a shaft to valve member 66 which has an orifice plate 67 with an orifice 68 therein. The orifice 68 is shaped to vary the flow therethrough non-linearly, which permits larger particles to readily pass through the orifice.

Figure 4:
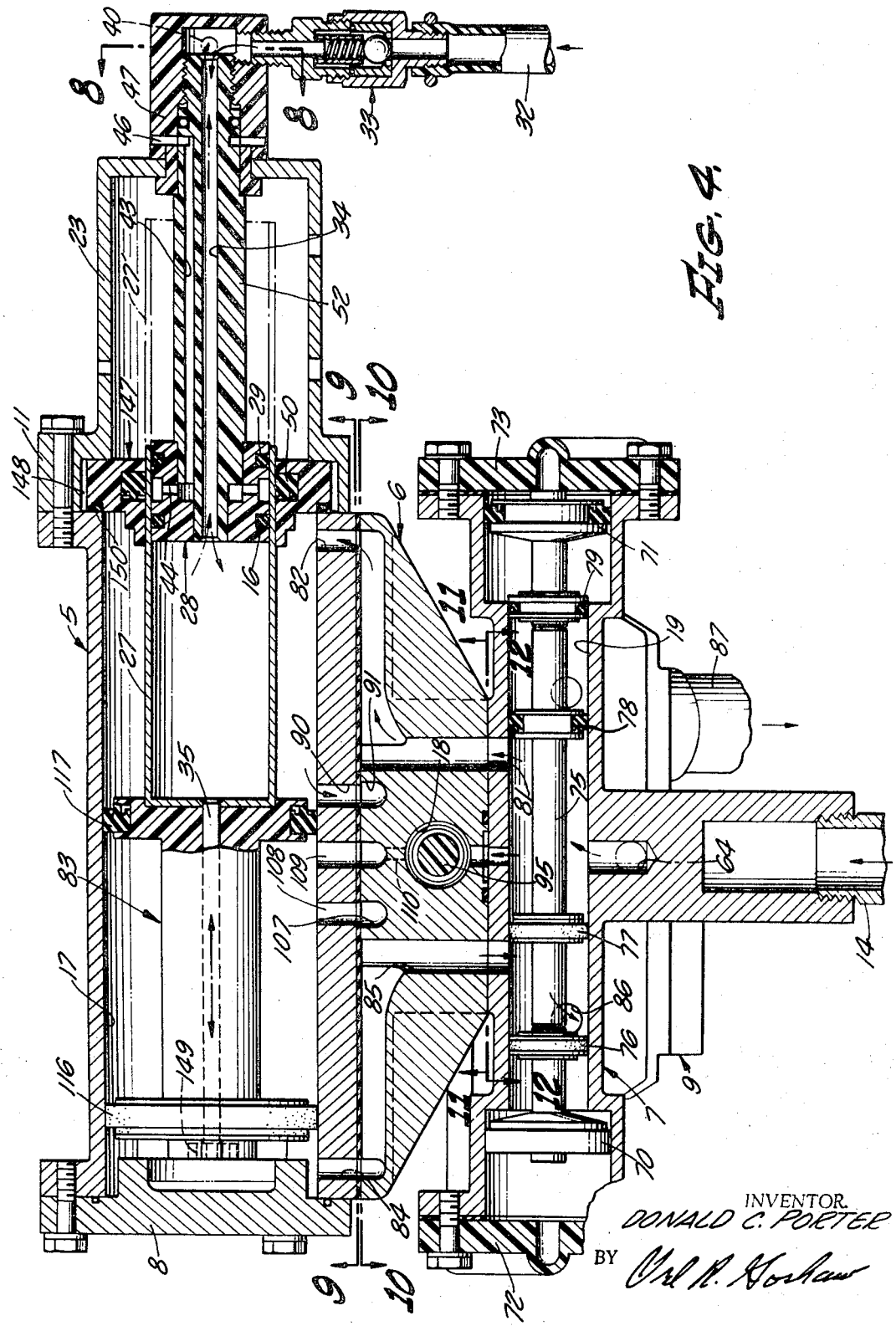
FIG. 4 is a cross-sectional view of the invention taken along the line 4—4 og FIG. 2.

Referring, now to FIG. 4, the coupling 11 contains a seal 28 which utilizes spaced sealing members such as O-rings 16, 29 bearing against the inside surface of the injection cylinder 27, and a U-cup seal 50 bearing against the outside surface of the cylinder. This seal is stationary but permits axial longitudinal movement of the injection cylinder 27 therethrough as shown by the phantom lines 27'. The seal also separates the chamber within the housing 23 from the area between the injection cylinder 27 and the walls of power cylinder 17. The seal 28 thus forms an end wall for the power cylinder 17. The chamber within the housing 23 is maintained at atmospheric pressure by means of vent holes 24. A space 148 and an O-ring 150 permits the seal assembly 147 to float or self-align itself with injection cylinder 27.

The other end of the end bell 23 has a connector 47 between the input and output of injection cylinder 27 and check valve 33. The connector 47 has a transverse passage 46 therein exposed to the atmosphere. Extending from one end of connector 47 to the interior of cylinder 27 is a cylinder 52 having a longitudinal axial bore 34 therein, the bore terminating into the interior of the injection cylinder 27, the other end of the bore being connected to check valve unit 33 through port 40. In this manner, longitudinal action of the injection cylinder 27 to the left will draw liquid fertilizer into the interior of the injection cylinder 27, through check valve 33, and when moved in the opposite direction, will eject the fertilizer through the bore 34, port 40, and check valve 41, as shown by the dotted line arrows in FIG. 1.

As mentioned above, certain gases or vapors from any reaction between the water and the fertilizer compositions can be damaging to the pump conduit system and the elements thereof. To eliminate these vapors, the O-rings 16, 29 isolating the interior of the housing 23 from the interior of the injection cylinder 27 are separated by an intermediate area and the cylinder 52 is provided with one or more longitudinal ducts 43 extending from the end of a transverse duct 44 to the intermediate area of the seal 28 to the duct 46 exposed to the atmosphere. In this manner, all vapors formed within the intermediate area of the seal 28, which is the only area where water and fertilizer and vapors thereof can come in contact, are drained out of the pump.

To describe the operation of the invention, when valve 15 is open, water from the pipe 13 flows through inlet 14 in casting 7, through passage 56, filters 57–58, passage 59, into metering valve 22, as shown in FIGS. 2 and 3. The knob 65 is adjusted to provide the desired speed of operation of the pump. From the metering valve, water is directed through passage 64 into the central portion of main control valve 19, having water pressure operating pistons 70 and 71 having end bells 72 and 73. Between piston 70 and 71 is a shaft 75 which has mounted thereon cylindrical seals 76, 77, 78, and 79. The shaft 75 may be sectionalized for ease of assembly and alignment. The water from passage 64 enters the control valve 19 between seals 77 and 78, and then with the valve position shown in FIG. 4, passes through passage 81, port 82, into the right hand end of cylinder 17 and behind the seal 117 to actuate the piston 83 to the left, this position being shown in FIG. 4. During the movement of the piston, the water behind the left hand seal 116 is forced through port 84, through passage 85, and into the area between valve seals 76 and 77, and then through port 86 into discharge manifold 9 where it is discharged from the pump out of port 87. (See FIG. 2.) When piston 83 reaches this left hand end position (FIG. 4), the main water pressure is directed through port 90, port 91 to end bell 92 of the pilot valve, where it acts on piston 93 to move the pilot valve to the right in FIG. 2. This action shifts shaft 95 to the right in FIG. 2, together with the seals 96, 97, 98 and 99. The water behind piston 105 at the other end of shaft 95 is now forced through end bell 106, through port 107, through port 108, port 109, and port 110 to discharge manifold 9.

When the pilot valve just described is shifted to the right in FIG. 2, water is directed through tube 115 to piston 71 of the control valve to shift the seals of the control valve to the left, which opens port 84–85 to water pressure to move the power piston 83 to the right by the pressure behind seal 116. Since movement of the power piston and injection cylinder to the left in FIG. 4 draws fertilizer into cylinder 27, the reverse movement of cylinder 27 to the right ejects the liquid fertilizer from ejection cylinder 27 through bore 34 and port 40, through check valve 41, and into water pipe 13 at the discharge pipe 42. The other half of the complete cycle is the reverse of the half cycle just described, thus producing a reciprocating axial movement of the injection cylinder 27. It is to be noted that the water conduits and passages are such as to prevent the water from coming in contact wih the ferilizer in the control valve, and also that the fertilizer passages are removed from the water passages so there is no possibility of a mixture of the two in the pilot or control valve to reduce their operating life. The only possible contact would be in the seal 28, and, as mentioned above, any corrosive vapors are bled off through port 46.

Referring, now, to FIGS. 6 and 7, a flush valve is shown consisting of a plastic liner 120 in which is a shaft 121 on which are mounted seals 122, 123, and 124. The shaft 121 has ends 125 and 126 which extend exteriorly of the liner 120 and which are used to manually actuate the shaft and seals. When the flush valve shaft 121 is shifted to the left, it shuts off the flow of liquid fertilizer from tube 30 by positioning the seal 123 between ports 128 and 129 and now the discharge water in the reservoir 9 is diverted through port 127, through tube 32, and through the fertilizer section of the pump. This flushes any fertilizer residue in the fertilizer portion of the pump to avoid corrosion during non-operation of the pump. Flushing action may be accomplished during operation of the pump, as the water will be drawn in and forced out by injection cylinder 27.

The above-described pump, therefore, maintains the water channels separate from the fertilizer channels and provides bleeder action for any destructive vapors in addition to the flushing action for the fertilizer channels.

If a lower volume of water is used requiring the orifice 68 to be adjusted to this low volume, the volume may be controlled by a pressure control valve in the input water line instead of the coupling 14. This provides greater reliability at low volumes by preventing any clogging in the water input portion of the pump. Furthermore, a second end bell unit could be used at the other end of the power cylinder if desired.

I claim:
1. A hydraulic pump for injecting a first liquid into a second liquid comprising:
   a power cylinder having a power piston therein having two driven ends, said power piston being adapted to be axially reciprocated by said second liquid;
   an injection cylinder having a diameter less than that of said power piston extending axially from one of said driven ends of said power piston;
   an end bell housing vented to the atmosphere;
   a stationary seal separating said housing and said power cylinder and through which said open end of said injection cylinder is slidable said seal having portions bearing on the inside and outside of said injection cylinder, said outside bearing portion forming an end wall for said power cylinder; and
   an axially aligned fixed, cylinder having one end passing through and attached to said seal on said portion of said seal bearing on the inside surface of said injection cylinder and its other end attached to said housing, said fixed cylinder having an axial opening therethrough, movement of said power piston in one direction drawing said first liquid through said opening into said injection cylinder and movement of said power piston in the reverse direction ejecting said first liquid through said opening and into said second liquid.

2. A hydraulic pump in accordance with claim 1 wherein:
the portion of said seal bearing on the inside surface of said injection cylinder includes a pair of O-rings spaced by an intermediate area; and
at least one longitudinal additional opening is provided in said fixed cylinder, one end of which is connected to said intermediate area of said seal, the other end of said additional opening being connected to a transverse opening having an end thereof exposed to the atmosphere.

3. A hydraulic pump for injecting a first liquid into a second liquid under power provided by said second liquid comprising:
a power cylinder having an axially slidable power piston therein having two driven ends;
means for alternately directing said second liquid behind said driven ends of said power piston;
a hollow injection cylinder having a diameter less than that of said power piston connected to one of said driven ends of said power piston and adapted to be actuated thereby;
an end bell housing connected to said power cylinder and in which said injection cylinder is axially movable, said end bell housing being vented to the atmosphere;
a seal separating said housing and said power cylinder, said injection cylinder being slidable through said seal, said seal having portions bearing on the inside and outside of said injection cylinder, said outside bearing portion forming an end wall for said power cylinder, and with said inside bearing portion of said seal between the interior of said housing and the interior of said injection cylinder including a pair of sealing members spaced by an intermediate area;
a fixed cylinder connected to said seal and to one end of said housing, said fixed cylinder having an axial first bore therein open to the interior of said injection cylinder and connected to a source of said first liquid for drawing said first liquid through said first bore and into said injection cylinder when said injection cylinder is moved in one direction and to eject said first liquid from said injection cylinder through said first bore when said injection cylinder is moved in the reverse direction, said fixed cylinder further having a second bore therethrough isolated from said axial first bore, said second bore communicating between said intermediate area of said seal and the atmosphere.

4. A pump for a pair of liquids of different compositions and adapted to be mixed comprising:

a hydraulic piston having two driven ends reciprocally actuated by one of said liquids;
a hollow cylinder having a diameter less than that of said piston attached to one of said driven ends of said piston;
a piston cylinder surrounding said piston;
an end bell housing attached to said piston cylinder, said housing being vented to the atmosphere;
a seal separating the interiors of said piston cylinder and said housing, said hollow cylinder being adapted to be reciprocated between said interiors through said seal, said seal having portions bearing on the inside and outside of said injection cylinder, the outside bearing portion forming an end wall for said power cylinder and with the portion of said seal bearing on the inside surface of said hollow cylinder including a pair of O-rings set in grooves separated by an intermediate area with means for venting said intermediate area to the atmosphere; and
a fixed cylinder positioned coaxially in said end bell housing having one end attached to said inside bearing portion of said seal and the opposite end attached to a connector in said end bell housing, said fixed cylinder having a coaxial bore therein for conducting said other fluid from a source thereof to the interior of said hollow cylinder during movement thereof in one direction and for conducting said other fluid in the opposite direction for mixing with said first-mentioned liquid during movement of said hollow cylinder in the opposite direction to said first movement.

5. A pump in accordance with claim 4 wherein said means for venting said intermediate area includes at least one additional longitudinal passage through said fixed cylinder with a transverse axial passage in said seal connecting the seal end of said additional passage to said intermediate area, the other end of said additional passage being exposed to the atmosphere through said connector.

References Cited
UNITED STATES PATENTS

| | | | |
|---|---|---|---|
| 2,841,165 | 7/1958 | Emery | 137—99 |
| 2,920,640 | 1/1960 | Porter | 137—99 |
| 3,114,379 | 12/1963 | Cordis | 137—99 XR |
| 3,174,505 | 3/1965 | Bauer | 137—505.18 |
| 3,205,825 | 9/1965 | Kojabashian | 103—158 XR |
| 3,289,847 | 12/1966 | Rothemund | 210—266 |
| 3,330,290 | 7/1967 | Porter | 137—99 |
| 2,631,001 | 3/1953 | Griswold | 137—312 |
| 2,825,590 | 3/1958 | Sutherland | 277—188 X |

HAROLD W. WEAKLEY, Primary Examiner

U.S. Cl. X.R.

103—198; 137—312; 277—59